J. S. LIPPS.
MANUFACTURE OF ILLUMINATING GAS.

No. 85,458. Patented Dec. 29, 1868.

Witnesses.
A. Kellise
A. Kinnier

Inventor.
John S. Lipps.

United States Patent Office.

JOHN S. LIPPS, OF NEW YORK, N. Y.

Letters Patent No. 85,458, dated December 29, 1868.

---

IMPROVEMENT IN THE MANUFACTURE OF ILLUMINATING-GAS.

---

The Schedule referred to in these Letters Patent and making part of the same.

---

*To all whom it may concern:*

Be it known that I, JOHN S. LIPPS, of the city, county, and State of New York, have invented certain new and useful Improvements in the Manufacture of Illuminating-Gas; and I do hereby declare that the following is a full, clear, and exact description of the same, reference being had to the accompanying drawings, forming part of this specification, in which—

Similar letters of reference indicate corresponding parts in both figures.

Figure 1:
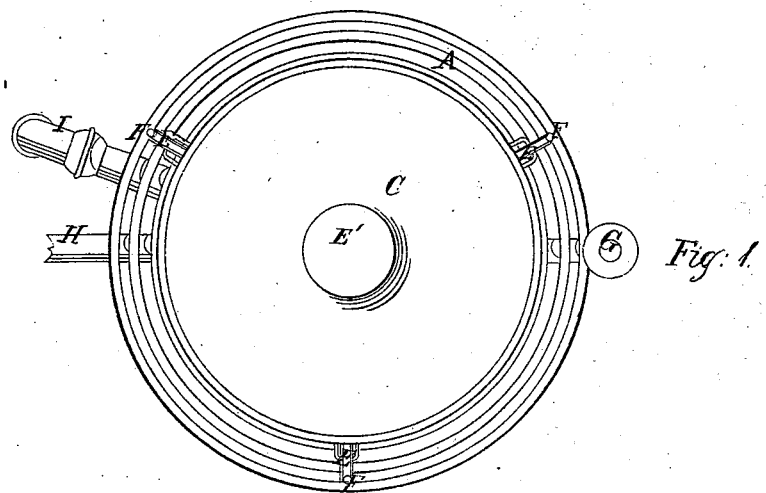
Figure 1 is a plan of the apparatus employed in carrying out my invention.

This improvement consists, first, in the manufacture of illuminating-gas, by passing hydrogen, in a nascent state, through gasoline, such gas being permanent, and incapable of condensation at ordinary atmospheric temperatures, and at any pressure at which it will be necessary to use it for the purpose of illumination, and having a very high illuminating power.

It consists, secondly, in the manufacture of such illuminating-gas, from hydrogen and gasoline, or other hydrocarbon liquid, by so placing the said liquid in the same vessel with the acid by or from which the hydrogen is generated, that the said liquid floats upon the acid, and the hydrogen, as it rises in bubbles from the acid, passes upward through the said liquid.

It consists, thirdly, in a novel construction and arrangement of apparatus for the manufacture of such gas, whereby the manufacture is made self-regulating, according to the demand or consumption.

To enable others skilled in the art to make and use my invention, I will proceed to describe its construction and operation.

A is a tank, of any water-tight material, of cylindrical or other suitable form, within which there is arranged a smaller vessel or reservoir, B, of about the same height, made of copper, lead, or other material, that will not be acted upon by the acid that is used to generate hydrogen, the latter vessel being, like the tank, open at the top.

C is a cylinder, open at the bottom, and closed at the top, like the gas-holder of an ordinary gasometer, inserted between the tank A and reservoir B, the annular space between which is nearly filled with water, to form a seal around the lower edges of the cylinder or gas-holder, C.

To the top of this gas-holder there is secured a basket, D, made of perforated metal, or other material that will not be acted upon by the acid used to generate hydrogen.

This basket is of about the same depth as the gas-holder. It is closed at the top, but has a suitable aperture, fitted with a tight stopper, E', which is removed for filling the basket with scrap zinc or tin-plate, or other metal, the reaction of acid upon which will produce hydrogen.

The gas-holder has attached to its upper part grooved guide-rollers, working against vertical columns F F, erected upon the tank A, for the purpose of guiding the gas-holder in its movements up and down.

G is a pipe for supplying acid and gasoline to the reservoir B, connected with the said reservoir near the bottom, and carried upward to or slightly above the level of the reservoir, and furnished at its upper end with a funnel.

H is a pipe for the exit of the gas from the gas-holder, passing through the lower part of the reservoir B, and through the tank A, and extending upward within the reservoir to about the level of the top thereof. To the lower end of this pipe is connected the service-pipe for the supply of the gas to the burners.

I is a cock for drawing off the contents or waste matters which collect at the bottom of the reservoir B, whenever necessary.

Figure 2:
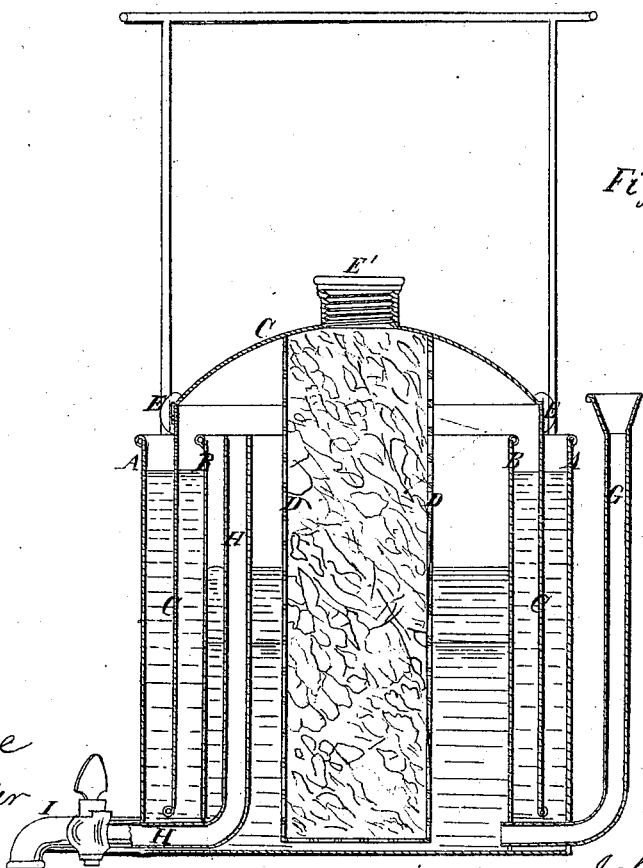
Figure 2 is a vertical section of the same.

The operation is as follows:

The reservoir B is filled about half full, as shown in blue tint in fig. 2 of the drawing, of dilute sulphuric, muriatic, or acetic acid, composed of about five (5) parts water to one (1) acid, and then up to about three-quarters full, as shown in pink tint in the drawing, with gasoline, which floats upon the acid; and the basket D, having been filled with scrap zinc or tin-plate, or other cheap material, the reaction of acid upon which produces hydrogen, and closed by screwing in the stopper E', the manufacture of illuminating-gas at once commences by the generation of hydrogen from the acid and the material in that portion of the basket D which is immersed therein, and the rising of this hydrogen in and through the gasoline.

The process is materially assisted by the heat evolved in the chemical reaction between the acid and the metal, and this heat facilitates the combination of the hydrogen with the carbon of the gasoline. The illuminating-gas thus obtained collects above the gasoline in the gasometer, whence it makes its egress through the pipe H.

In case of the gas being manufactured faster than it is consumed, its accumulation within the gasometer causes the gas-holder C to rise until it lifts the basket out of the acid, and the generation of hydogen at once ceases; hence the operation of the apparatus is self-regulating, according to the consumption.

As fast as the contents of the lower part of the basket, which enters the acid, are consumed, the contents of the upper part descend by gravitation to supply their place, and so the basket does not need very frequent replenishment.

When the supply of gasoline and acid within the reservoir runs short, more is fed in through the pipe G.

The illuminating-gas, thus made from hydrogen and gasoline, has such an extremely high illuminating-power that the same size of service-pipe as is used for common coal-gas will supply about twice the number of burners; and this advantage is still greater relatively to what is called air-gas, made by passing air through gasoline.

which requires a larger pipe and larger burners than coal-gas.

It is so permanent in its character as to show that a chemical combination is effected between the hydrogen and a portion of the gasoline.

It can be made very cheaply, as the impure sulphuric acid, which has been used in the purification of pretroleum, and which can be purchased at a small fraction of the cost of pure acid, serves the purpose as well, and the gasoline which is used may be of the lowest grade, which can be purchased at one-fourth the price of that which is necessary to produce what is called the air-light.

What I claim as my invention, and desire to secure by Letters Patent, is—

1. The manufacture of illuminating-gas, by passing hydrogen, in its nascent state, through gasoline, substantially as herein described.

2. The manufacture of illuminating-gas from hydrogen and gasoline, or other hydrocarbon-liquid, by so placing the said liquid in the same vessel with the acid by or from which the hydrogen is generated that the said liquid floats upon the acid, and the hydrogen, as it rises from the acid, passes through the said liquid, substantially as herein described.

3. The combination and arrangement of the reservoir B, containing the acid and the gasoline, or other hydrocarbon-liquid, the gas-holder C, and the basket D, for containing the metal, whereby the production of the illuminating-gas is made self-regulating, according to the demand or consumption, substantially as herein specified.

JOHN S. LIPPS.

Witnesses:
HENRY T. BROWN,
ARTHUR KINNIER.